(12) United States Patent
Hong et al.

(10) Patent No.: US 10,360,655 B2
(45) Date of Patent: Jul. 23, 2019

(54) APPARATUS AND METHOD FOR CONTROLLING MOTION-BASED USER INTERFACE

(71) Applicant: Samsung Electronics Co., Ltd., Suwon-si, Gyeonggi-do (KR)

(72) Inventors: Hyun-Su Hong, Seongnam-si (KR); Yung-Keun Jung, Suwon-si (KR); Jae-Myeon Lee, Yongin-si (KR); Il-Hwan Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/450,684

(22) Filed: Mar. 6, 2017

(65) Prior Publication Data

US 2017/0178284 A1    Jun. 22, 2017

Related U.S. Application Data

(63) Continuation of application No. 13/879,203, filed as application No. PCT/KR2011/007628 on Oct. 13, 2011, now Pat. No. 9,588,613.

(30) Foreign Application Priority Data

Oct. 14, 2010    (KR) .................. 10-2010-0100435

(51) Int. Cl.
*G06T 3/00*    (2006.01)
*G06F 1/16*    (2006.01)
(Continued)

(52) U.S. Cl.
CPC .......... *G06T 3/0006* (2013.01); *G06F 1/1626* (2013.01); *G06F 1/1694* (2013.01);
(Continued)

(58) Field of Classification Search
CPC ................... G06F 3/041; G06F 3/0346; G06F 2203/04104
See application file for complete search history.

(56) References Cited

U.S. PATENT DOCUMENTS 6,317,114 B1 * 11/2001 Abali ....................... G09G 1/04
                                                                345/672
6,834,249 B2 * 12/2004 Orchard .................. G01P 13/00
                                                                702/141

(Continued)

FOREIGN PATENT DOCUMENTS

CN         1484785 A      3/2004
CN       101014927 A      8/2007
(Continued)

OTHER PUBLICATIONS

Chinese Office Action dated May 29, 2019, issued in the Chinese Application No. 201710066015.1.

*Primary Examiner* — Ricardo Osorio
(74) *Attorney, Agent, or Firm* — Jefferson IP Law, LLP

(57) ABSTRACT

A method and apparatus for controlling a motion-based user interface are provided. The apparatus includes a touch screen for displaying an image and for receiving input of a user touch on at least one spot of the touch screen, a sensor unit for sensing a motion of the apparatus, a motion calculator for calculating a degree of the motion of the apparatus, when sensing the motion of the apparatus at the sensor unit, and a controller for, when the at least one spot is touched on the touch screen, determining the number of touched spots, for receiving information about the degree of the motion of the apparatus from the motion calculator, and for determining whether to change the size of the image or the position of the image according to the number of touched spots.

18 Claims, 9 Drawing Sheets

(51) Int. Cl.
*G06F 3/0488* (2013.01)
*G06F 3/041* (2006.01)
*G06F 3/0484* (2013.01)

(52) U.S. Cl.
CPC .......... *G06F 3/0416* (2013.01); *G06F 3/0488* (2013.01); *G06F 3/04845* (2013.01); *G06F 3/04883* (2013.01); *G06F 2200/1614* (2013.01); *G06F 2200/1637* (2013.01); *G06F 2203/04806* (2013.01); *G06F 2203/04808* (2013.01)

(56) References Cited

U.S. PATENT DOCUMENTS

| | | | | |
|---|---|---|---|---|
| 7,271,795 | B2* | 9/2007 | Bradski | G06F 1/1626 345/158 |
| 7,573,382 | B2* | 8/2009 | Choubey | G06Q 10/06 340/286.07 |
| 7,679,604 | B2* | 3/2010 | Uhlik | G01P 13/00 345/156 |
| 8,089,352 | B2* | 1/2012 | Park | G06F 3/0346 340/517 |
| 8,825,113 | B2* | 9/2014 | Kim | G06F 1/1624 345/173 |
| 8,872,854 | B1* | 10/2014 | Levitt | G06F 3/147 345/633 |
| 8,977,987 | B1* | 3/2015 | Korn | G06F 3/016 715/702 |
| 9,069,398 | B1* | 6/2015 | Sadhvani | G06F 3/041 |
| 9,595,083 | B1* | 3/2017 | Smith | G06T 19/20 |
| 2002/0167699 | A1 | 11/2002 | Verplaetse et al. | |
| 2003/0047683 | A1* | 3/2003 | Kaushal | G02B 23/12 250/330 |
| 2004/0100441 | A1 | 5/2004 | Rekimoto et al. | |
| 2005/0276448 | A1* | 12/2005 | Pryor | B60K 35/00 382/103 |
| 2006/0026521 | A1 | 2/2006 | Hotelling et al. | |
| 2006/0061557 | A1 | 3/2006 | Kyrola | |
| 2006/0158545 | A1* | 7/2006 | Hirai | H04N 5/23248 348/333.01 |
| 2007/0177804 | A1 | 8/2007 | Elias et al. | |
| 2007/0232336 | A1* | 10/2007 | Kim | G06F 1/1626 455/466 |
| 2007/0279755 | A1* | 12/2007 | Hitschmann | G02B 27/0101 359/630 |
| 2008/0036743 | A1 | 2/2008 | Westerman et al. | |
| 2008/0174742 | A1* | 7/2008 | Ito | G03B 21/006 353/31 |
| 2008/0186701 | A1* | 8/2008 | Omi | G06K 9/00604 362/231 |
| 2008/0211766 | A1 | 9/2008 | Westerman et al. | |
| 2008/0280642 | A1 | 11/2008 | Coxhill et al. | |
| 2008/0284739 | A1 | 11/2008 | Andrews et al. | |
| 2008/0309508 | A1* | 12/2008 | Harmon | G06F 1/1626 340/686.1 |
| 2009/0088204 | A1 | 4/2009 | Culbert et al. | |
| 2009/0138800 | A1 | 5/2009 | Anderson et al. | |
| 2009/0303204 | A1 | 12/2009 | Nasiri et al. | |
| 2010/0053221 | A1 | 3/2010 | Kaneko et al. | |
| 2010/0058254 | A1* | 3/2010 | Narita | G06F 3/0481 715/863 |
| 2010/0090971 | A1 | 4/2010 | Choi et al. | |
| 2010/0134312 | A1 | 6/2010 | Park et al. | |
| 2010/0156806 | A1* | 6/2010 | Stallings | G06F 3/04883 345/173 |
| 2010/0245232 | A1 | 9/2010 | Birnbaum et al. | |
| 2011/0005367 | A1 | 1/2011 | Hwang et al. | |
| 2011/0087988 | A1* | 4/2011 | Ray | G06Q 10/06 715/771 |
| 2011/0216064 | A1* | 9/2011 | Dahl | G06F 1/1616 345/428 |
| 2011/0304611 | A1* | 12/2011 | Suzuki | G06T 15/04 345/419 |
| 2012/0044208 | A1* | 2/2012 | Yun | G06F 3/0426 345/175 |
| 2012/0063740 | A1* | 3/2012 | Lee | H04N 13/02 386/230 |
| 2012/0293440 | A1* | 11/2012 | Hotelling | G06F 3/0418 345/173 |
| 2014/0313151 | A1 | 10/2014 | Kim et al. | |
| 2016/0117096 | A1 | 4/2016 | Miyashita et al. | |

FOREIGN PATENT DOCUMENTS

| | | |
|---|---|---|
| CN | 101198925 A | 6/2008 |
| CN | 101655769 A | 2/2010 |
| EP | 1 615 102 A2 | 1/2006 |
| JP | 6-4208 A | 1/1994 |
| JP | 7-271505 A | 10/1995 |
| JP | 2008-508600 A | 3/2008 |
| JP | 2009-157908 A | 7/2009 |
| JP | 2009-525538 A | 7/2009 |
| JP | 2010-55511 A | 3/2010 |
| JP | 2010-086519 A | 4/2010 |
| JP | 2010-182071 A | 8/2010 |
| JP | 2010-225155 A | 10/2010 |
| JP | 2011-028635 A | 2/2011 |
| KR | 10-2009-0093766 A | 9/2009 |
| KR | 10-2009-0128238 A | 12/2009 |
| RU | 2007 101 283 A | 8/2008 |
| WO | 2008/085759 A2 | 7/2008 |
| WO | 2010/076772 A2 | 7/2010 |

* cited by examiner

APPARATUS AND METHOD FOR CONTROLLING MOTION-BASED USER INTERFACE

PRIORITY

This application is a continuation application of prior application Ser. No. 13/879,203, filed on Apr. 12, 2013, which will issue as U.S. Pat. No. 9,588,613 on Mar. 7, 2017, and which is a National Stage application under 35 U.S.C. § 371 of an International application filed on Oct. 13, 2011 and assigned application No. PCT/KR2011/007628, and claimed the benefit under 35 U.S.C § 119(a) of a Korean patent application filed on Oct. 14, 2010 in the Korean Intellectual Property Office and assigned Serial No. 10-2010-0100435, the entire disclosure of which is hereby incorporated by reference.

BACKGROUND OF THE INVENTION

1. Field of the Invention

The present invention relates to a user interface. More particularly, the present invention relates to an apparatus and method for controlling an interface according to a motion that a mobile terminal has made.

2. Description of the Related Art

Currently, electronic devices such as TVs, MP3 players, Portable Multimedia Players (PMPs), smart phones, and the like are equipped with a variety of input/output devices in order to enable a user to conveniently control the electronic device.

Among these input/output devices, the utilization of smart phones has recently increased exponentially. The proportion of devices using touch panels is rapidly growing in the market of mobile terminals, including a portable phone, a smart phone, and a laptop. As touch screen panels are expected to gain more popularity, the market for touch screens for mobile terminals will be rapidly boosted. Touch screen panels are also widely used in electronic appliances such as TVs or refrigerators. The market of electronic appliances will likely rank second in adopting touch screen panels, following the mobile terminal market.

Recently, extensive research has been made on recognition of a user's intention and action based on visual information, for natural interaction between a user and a touch screen. Typically, a user-friendly user interface is configured to recognize a gesture input by a finger or a touch pen. The trend of user interfaces is now shifting from an interface that operates according to a single finger-based single touch input on a touch screen to an interface that operates according to a multi-finger-based multi-touch input on a touch screen.

A touch screen is includes a plane (e.g., substrate) for sensing an input and a plane serving as a display. Therefore, a user's intention can be analyzed and perceived from a multi-touch input on the touch screen and the analysis and perception result may be output on the touch screen. A multi-touch-based user interface is designed in such a manner that the number of finger touches/pen touches on the touch screen and an associated operation are recognized and an associated command is executed. The interior structure of a mobile terminal supporting multi-touch input is described below.

FIG. 1 is a block diagram of a mobile terminal supporting multi-touch input according to the related art.

Referring to FIG. 1, the mobile terminal includes an output unit 101, a controller 103, a memory 105, and an input unit 107.

The output unit 101 outputs an image (such as a drawing or a Web page) on a touch screen. The image such as a drawing or a Web page is stored in the memory 105. When the image is output on the touch screen, a user may enlarge or shrink the image using the input unit 107 according to user selection. An intended part of the image displayed on the touch screen may be enlarged or contracted by touching the intended part with two fingers simultaneously. A touch pen may be used instead of fingers. Upon input of multiple touches through the input unit 107, the controller 103 controls the output unit 101 to display the multi-touched area enlarged or shrunk on the touch screen.

An exemplary operation performed upon input of multiple touches in the mobile terminal having the configuration illustrated in FIG. 1 is described below.

FIGS. 2A and 2B illustrate an exemplary operation performed upon input of multiple touches according to the related art. The operation is specifically for enlarging a specific area by multiple touches on a touch screen.

Referring to FIG. 2A, a user touches the touch screen 201 with two fingers 205 in a pinching motion to enlarge an image of a car 203 displayed on a touch screen 201. The enlarged area may be different depending on a position at which the two fingers 205 touch. Referring to FIG. 2B, the car image 203 is enlarged by spreading out the two fingers 205 on the touch screen 201. The degree to which the car image 203 is enlarged may depend on the distance between the two fingers 205 spread apart from each other.

While only the operation for enlarging an image is illustrated in FIGS. 2A and 2B, the enlarged image may also be shrunk using the two fingers 205.

According to the related art, the zoom-in or zoom-out ratio of a predetermined part of the touch screen may be adjusted only by pressing a predefined zoom-in or zoom-out key or making multiple touches. When a user wants to move from one page to another page or from one part to another part on the same page, the user is supposed to press a predefined move key or touch and drag an area of the touch screen. This means that for continuous zoom-in and zoom-out, the user should make consecutive key inputs or continuous multiple touches. In addition, to move from a specific part of a page to another part of the same page, the user should input keys successively or make continuous touches-and-drags, which the user may find inconvenient. Therefore, it is difficult to quickly and accurately perform a user-intended operation simply with an input on the touch screen or a gesture drawn on the touch screen.

SUMMARY OF THE INVENTION

Aspects of the present invention are to address at least the above-mentioned problems and/or disadvantages and to provide at least the advantages described below. Accordingly, an aspect of the present invention is to provide an apparatus and method for controlling a user interface so that an image may be enlarged, shrunk, and moved based on a motion.

In accordance with an aspect of the present invention, an apparatus for controlling a motion-based user interface is provided. The apparatus includes a touch screen for displaying an image and for receiving input of a user touch on at least one spot of the touch screen, a sensor unit for sensing a motion of the apparatus, a motion calculator for, when sensing the motion of the apparatus at the sensor unit, calculating a degree of the motion of the apparatus, and a controller for, when the at least one spot is touched on the touch screen, determining the number of touched spots, for receiving information about the degree of the motion of the apparatus from the motion calculator, and for determining whether to change the size of the image or the position of the image according to the number of touched spots.

In accordance with another aspect of the present invention, a method for controlling a motion-based user interface is provided. The method includes displaying an image on a touch screen, when at least one spot is touched on the touch screen, determining a number of the at least one touched spot, determining whether to change the size of the image or the position of the image according to the number of touched spots, and changing the size of the image or the position of the image according to a motion of an apparatus including the touch screen.

According to the apparatus and method of the present invention, the user may easily enlarge, shrink, and move an image using a motion.

BRIEF DESCRIPTION OF DRAWINGS

The above and other objects, features and advantages of certain exemplary embodiments of the present invention will be more apparent from the following description taken in conjunction with the accompanying drawings, in which.

Throughout the drawings, should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

Figure 1:
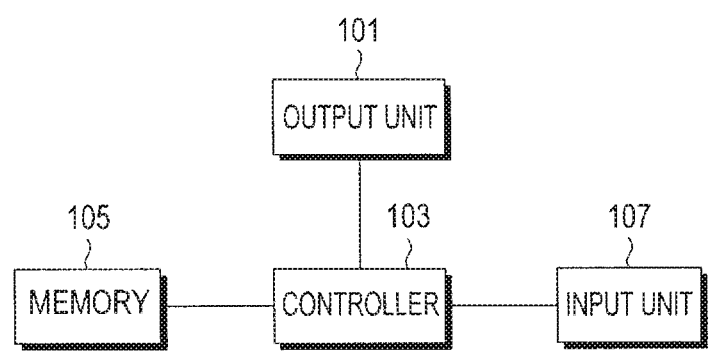
FIG. 1 is a block diagram of a mobile terminal supporting multi-touch input according to the related art.
Figure 2A:
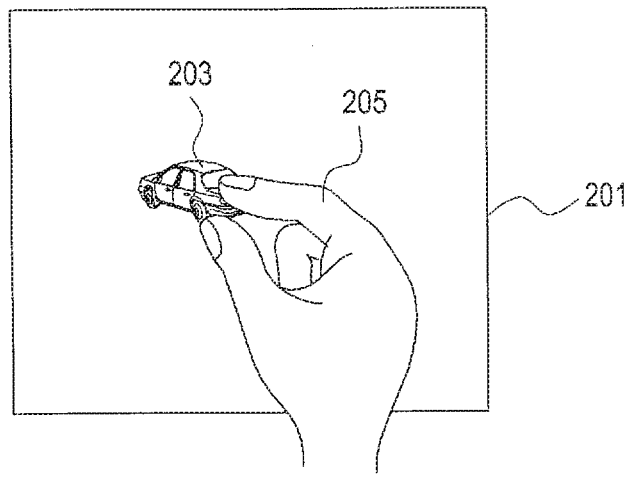
FIGS. 2A and 2B illustrate an exemplary operation that is performed based on a multi-touch input according to the related art.
Figure 2B:
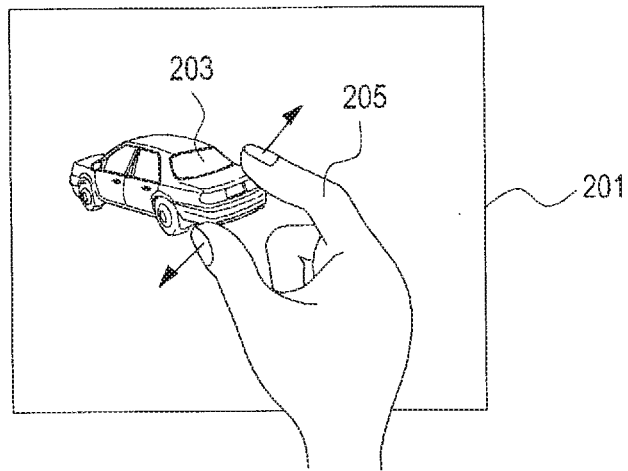
Figure 3:
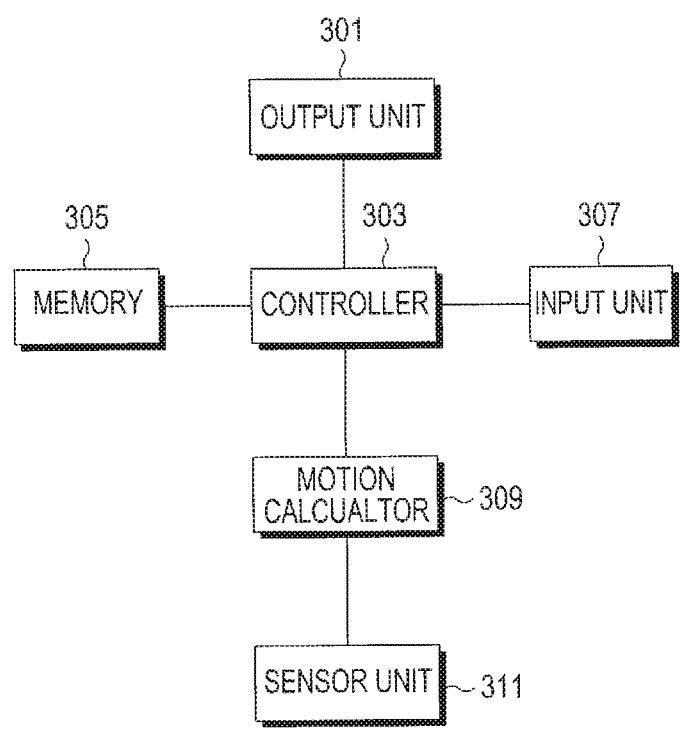
FIG. 3 is a block diagram of a mobile terminal for controlling a motion-based user interface according to an exemplary embodiment of the present invention.

FIG. 3 is a block diagram of a mobile terminal for controlling a motion-based user interface according to an exemplary embodiment of the present invention.

Referring to FIG. 3, the mobile terminal includes an output unit 301, a controller 303, a memory 305, an input unit 307, a motion calculator 309, and a sensor unit 311.

The output unit 301 outputs an image such as a photo or a Web page on a touch screen. The image is stored in the memory 305. When needed, another image stored in the memory 305 may be used or an intended photo may be captured using a camera module equipped in the mobile terminal. However, it is to be understood that an image may refer to any object (or portion thereof) displayed on the touch screen.

The input unit 307 receives information about the number of spots touched on the touch screen, a drag made on the touch screen, and the like. The motion calculator 309 calculates the movement direction or angle of the mobile terminal and transmits information about the calculated movement direction or angle to the controller 303. The mobile terminal may move up, down, to the left, and to the right. In addition, the mobile terminal may move in a horizontal direction toward the user or in a horizontal direction away from the user. The angle at which the mobile terminal has moved is calculated to be an angle at which the mobile terminal is inclined with respect to a current position set as 0 degree.

The motion calculator 309 uses the sensor unit 311 to calculate the movement direction or angle of the mobile terminal. The motion calculator 309 calculates a direction or angle in which the mobile terminal has moved using a gyroscope sensor from among one or more sensors of the sensor unit 311. The gyroscope sensor is a sensor adapted to sense rotations in addition to the functions of an acceleration sensor (i.e., accelerometer) and thus to track motions on 6 axes. Accordingly, compared to the acceleration sensor, the gyroscope sensor can sense more precise motions. The gyroscope sensor senses height and rotational inclination as well as acceleration and deceleration.

The controller 303 receives information about the number of touched spots and information about a touch and drag on the touch screen from the input unit 307, receives information about a calculated motion of the mobile terminal from the motion calculator 309, and controls an image displayed on the touch screen in a different manner according to the number of touched spots.

If two or more spots are touched in an area of the touch screen, the controller 303 determines the multi-touch input to be a command for enlarging or shrinking an image displayed on the touch screen and enlarges or shrinks the image according to information about a change in the motion of the mobile terminal received from the motion calculator 309. For example, when two spots are touched in an area of the touch screen and the mobile terminal is brought closer to the user at an unchanged angle or the touch screen of the mobile terminal is inclined forward with respect to the user, the image is enlarged. On the other hand, when the mobile terminal recedes from the user at an unchanged angle or the touch screen of the mobile terminal is reclined backward from the user, the image is shrunk. This method has the same effects as achieved in the multi-touch scheme according to the related art in which an image is enlarged or shrunk using two fingers, which will be apparent from a description of FIGS. 4A, 4B and 4C.

Figure 4A:
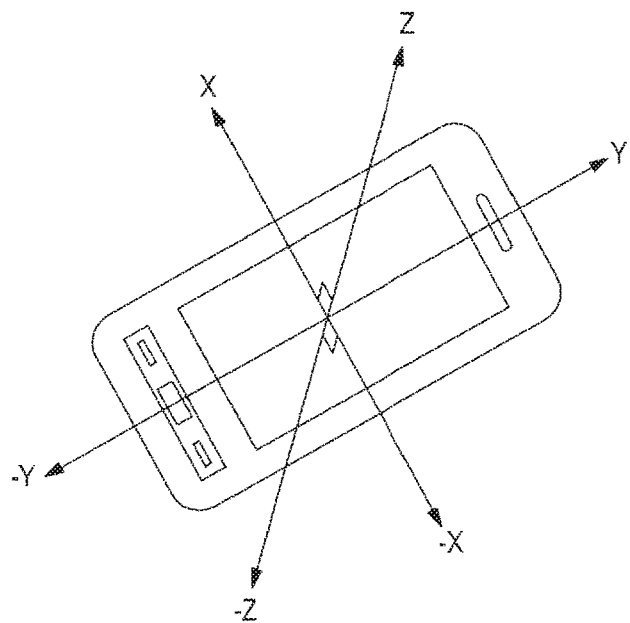
FIGS. 4A-4C are exemplary views illustrating motions of a mobile terminal according to an exemplary embodiment of the present invention.
Figure 4B:
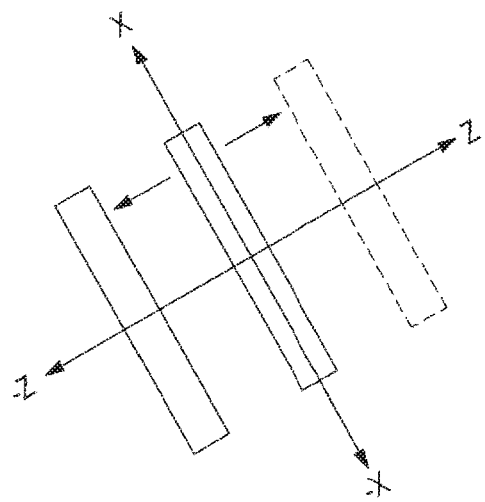
Figure 4C:
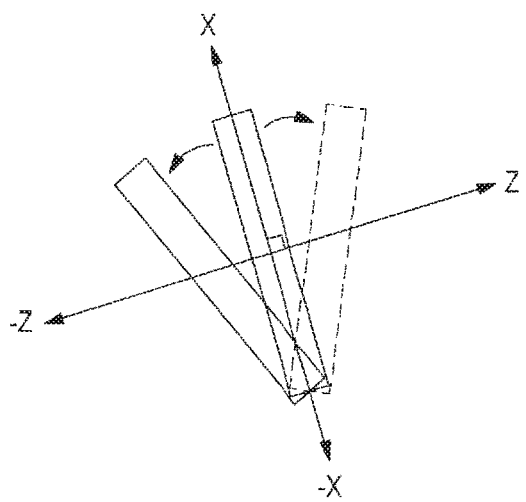

FIGS. 4A, 4B and 4C are exemplary views illustrating motions of the mobile terminal according to an exemplary embodiment of the present invention. In FIGS. 4A, 4B and 4C, it is assumed that a user touches two spots on the touch screen.

Referring to FIG. 4A, when the user pulls the mobile terminal in the −Z-axis direction with the current angle of the mobile terminal unchanged, facing the touch screen of the mobile terminal, while touching any two spots on the touch screen of the mobile terminal, a displayed image is enlarged. When the user pushes the mobile terminal in the Z-axis direction, facing the touch screen of the mobile terminal, the displayed image is shrunk. FIG. 4B is a side view of the mobile terminal, illustrating a path in which the mobile terminal is moved. In FIG. 4B, the mobile terminal is moved only in the Z-axis or −Z-axis direction without a change in its angle. FIG. 4C illustrates a variation in the inclination of the mobile terminal, with the Y and −Y axes set as a rotational axis. An image displayed on the touch screen may be enlarged or shrunk by inclining the mobile terminal forward or backward with respect to the user.

If the user touches one spot in an area of the touch screen, the controller 303 determines the single-touch input to be a command for moving an image displayed on the touch screen and moves the image up, down, to the left, or to the right according to information about a change in the motion of the mobile terminal received from the motion calculator 309. For example, if the user moves the mobile terminal to the left or rotates the mobile terminal to the left, while touching one spot in an area of the touch screen, a displayed image is moved to the left. The same effect as with a scheme for moving an image in an intended direction by touching and dragging an area of the touch screen is achieved, which will be apparent from FIG. 5.

Figure 5A:
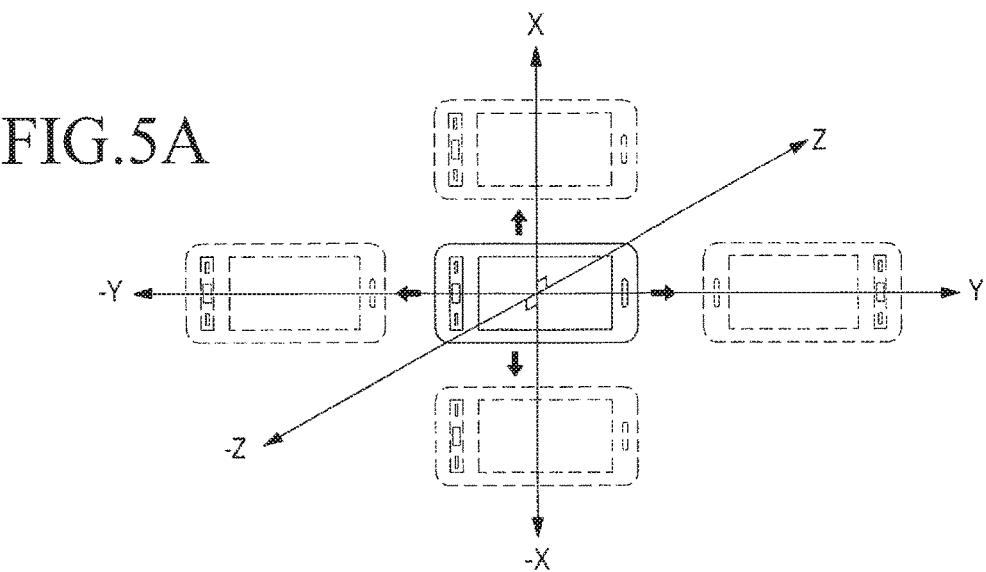
FIGS. 5A-5C are exemplary views illustrating motions of a mobile terminal according to an exemplary embodiment of the present invention.
Figure 5B:
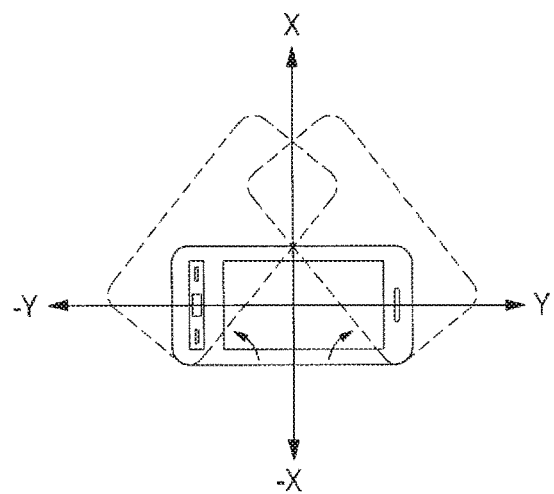
Figure 5C:
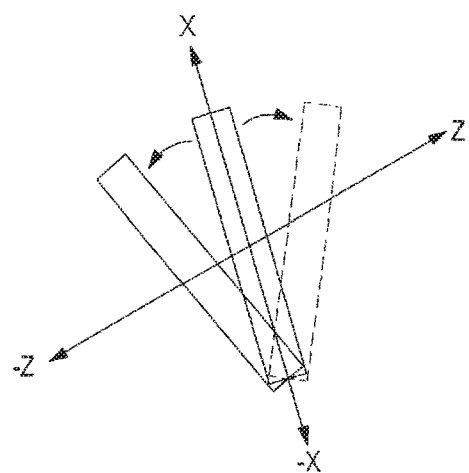

FIGS. 5A, 5B and 5C illustrate motions of a mobile terminal according to an exemplary embodiment of the present invention. In FIGS. 5A, 5B and 5C, it is assumed that the user touches one spot on the touch screen.

Referring to FIG. 5A, when the user moves the mobile terminal in the X-axis, −X-axis, Y-axis or −Y-axis direction, while touching one spot on the touch screen of the mobile terminal with the current angle of the mobile terminal unchanged, an image displayed on the touch screen moves in the direction in which the mobile terminal is moved. FIG. 5B illustrates changes in the rotation of the mobile terminal, with the Z and −Z axes set as a rotational axis and FIG. 5C illustrates changes in the rotation of the mobile terminal, with the Y and −Y axes set as a rotational axis. If the Z and −Z axes are set as a rotational axis and the mobile terminal is rotated to the right or to the left on the Y and −Y axes, the displayed image may move sideways. On the other hand, if the Y and −Y axes are set as a rotational axis and the touch screen of the mobile terminal is inclined or reclined on the Y and −Y axes, the displayed image may move up or down.

If the Y and −Y axes are set as a rotational axis, the displayed image may be transformed differently according to the number of touched spots on the touch screen. In FIG. 4C, the image is enlarged or shrunk, whereas in FIG. 5C, the image is moved up or down.

As is done according to the related art, the controller 303 may also control an image displayed on the touch screen in correspondence with a gesture such as a drag that may follow a touch of at least one spot in an area of the touch screen. For example, if one spot is touched in an area of the touch screen and the touched spot is dragged to the left, the display image may be moved to the left or the next image may be displayed. If two spots are touched on the touch screen, the image may be enlarged or shrunk according to the multi-touch scheme of the related art.

A description of an operation for controlling a displayed image is described below, with reference to the mobile terminal of FIG. 3.

Figure 6A:
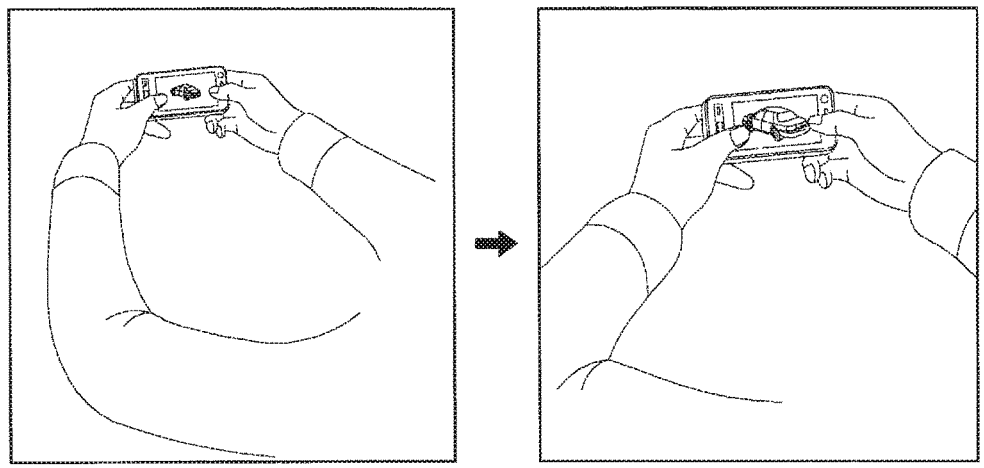
FIGS. 6A and 6B are exemplary views illustrating an operation for enlarging or shrinking an image according to an exemplary embodiment of the present invention.
Figure 6B:
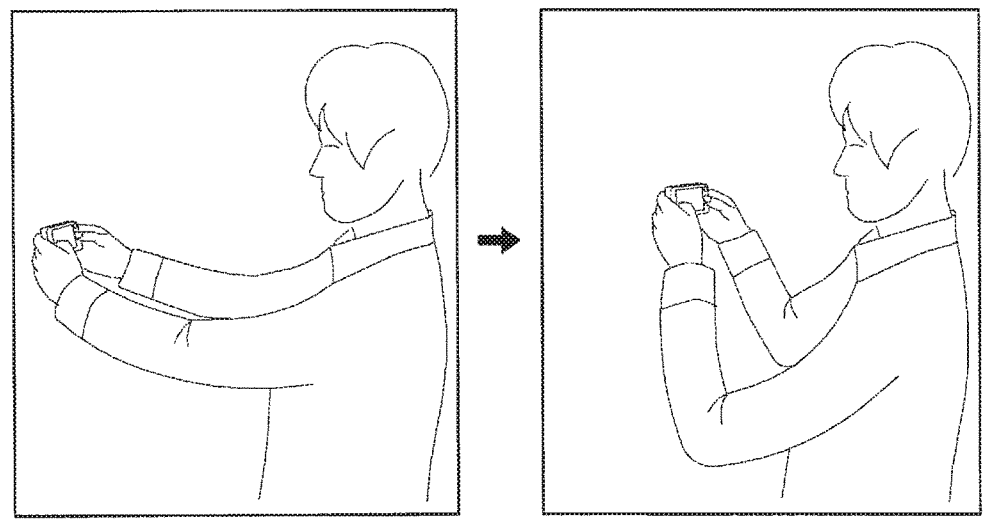

FIGS. 6A and 6B are exemplary views illustrating an operation for enlarging or shrinking an image according to an exemplary embodiment of the present invention.

Referring to FIG. 6A, the user pulls the mobile terminal, grabbing the touch screen so that two spots in an area of the touch screen are touched, while viewing the touch screen. A displayed image is enlarged in correspondence with the pulling motion. FIG. 6B is a side view illustrating the user pulling the mobile terminal. It is noted that the image is enlarged simply by bringing the mobile terminal closer to the user as illustrated in FIGS. 4A and 4B without inclining the mobile terminal forward with respect to the user.

While not shown in FIGS. 6A and 6B, when the user pushes the mobile terminal backward, grabbing the touch screen so that two spots in an area of the touch screen are touched, while viewing the touch screen, the displayed image may be shrunk. The function of enlarging an image by pulling the mobile terminal and shrinking an image by pushing the mobile terminal may be changed by a user setting. For instance, the function may be changed in such a manner that an image is shrunk by pulling the mobile terminal and enlarged by pushing the mobile terminal.

The zoom-in or zoom-out ratio of an image may be set to be proportional to a rotational angle measurement in each axis direction illustrated in FIGS. 4A to 5C, using the gyroscope sensor included in the sensor unit 311 of the mobile terminal displaced according to a user motion. In the situation where this image zoom-in or zoom-out function is available, the user may enlarge or shrink an image according to the conventional multi-touch scheme. While the multi-touch-based zoom-in or zoom-out function according to the related art is in progress, the motion-based image zoom-in or zoom-out function may be deactivated to avoid mutual interference between the functions according to the related art and the proposed zoom-in or zoom-out functions according to exemplary embodiments of the present invention.

If only one spot is touched or no touch is made on the touch screen, the image zoom-in and zoom-out operation is deactivated in the present invention.

Figure 7A:
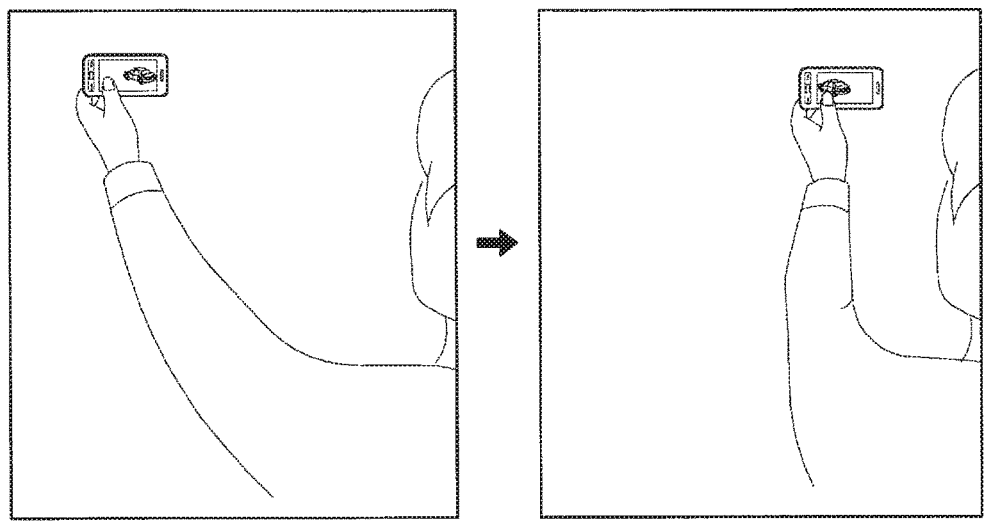
FIGS. 7A and 7B are exemplary views illustrating an operation for moving an image according to an exemplary embodiment of the present invention.
Figure 7B:
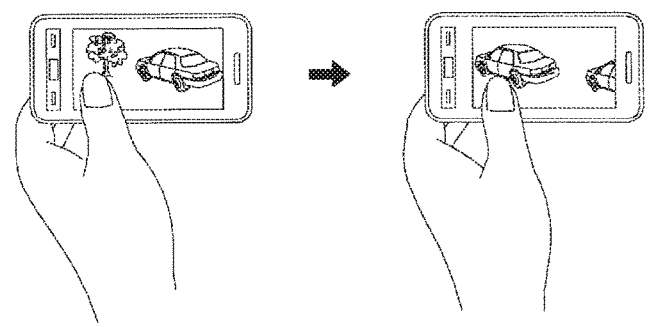

FIGS. 7A and 7B are exemplary views illustrating an operation for moving an image according to an exemplary embodiment of the present invention.

Referring to FIG. 7A, the user moves the mobile terminal from the left to the right, viewing the touch screen, while grabbing the mobile terminal so that one spot is touched in an area of the touch screen. An image displayed on the touch screen moves from the right to the left in correspondence with the motion of the mobile terminal.

Referring to FIG. 7B, focusing on the touch screen, the left touch screen displays an image prior to the movement, and the right touch screen displays an image output when the mobile terminal moves from the left to the right. As the image moves, an image hidden at the right side outside the screen appears on the screen. In the case where a plurality of images are arranged, the images may sequentially show up on the screen by moving the mobile terminal.

The distance for which an image moves may be set to be proportional to a rotational angle measurement in each axis direction illustrated in FIGS. 4A to 5C, using the gyroscope sensor included in the sensor unit 311 of the mobile terminal displaced according to a user motion. In the situation where this image shift function is available, the user may move an image by touching one spot and dragging the touch on the touch screen. During the dragging function, the motion-based image shift function may be deactivated to avoid mutual interference between the dragging function and the image shift function of the present invention.

According to exemplary embodiments of the present invention, tf only one spot is touched or no touch is made on the touch screen, the image shift operation is deactivated.

While it is described according to according to exemplary embodiments of the present invention that a displayed image can be controlled in a different manner according to the number of touched spots in an area of the touch screen, the same object may be achieved by assigning specific keys and controlling the displayed image according to the number of pressed keys, which is described below.

Figure 8A:
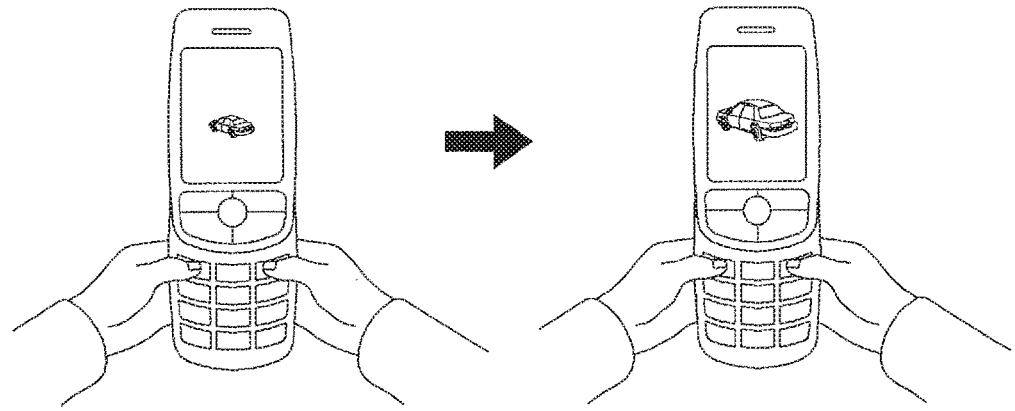
FIGS. 8A and 8B are exemplary views illustrating operations for controlling a motion-based user interface using predetermined keys according to an exemplary embodiment of the present invention.
Figure 8B:
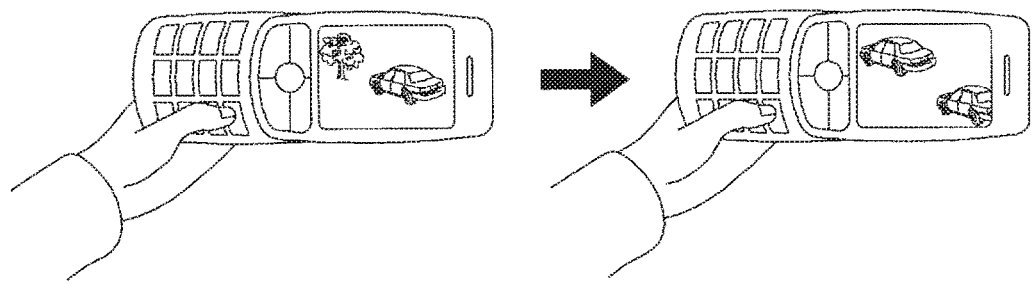

FIGS. 8A and 8B are exemplary views illustrating an operation for controlling a motion-based user interface using assigned specific keys according to an exemplary embodiment of the present invention.

Referring to FIG. 8A, when the user presses buttons of digits 1 and 3 at the same time or at a predetermined interval on a keypad while executing an image viewer (or other application), the mobile terminal may be set to recognize the motion as a command for enlarging or shrinking a displayed image. According to a subsequent motion of the mobile terminal, the displayed image may be enlarged or shrunk.

Referring to FIG. 8B, when the user presses either of the buttons of digits 1 and 3 on the keypad while executing the image viewer, the mobile terminal may be set to recognize the motion as a command for shifting a displayed image. The keypad may be replaced with buttons that operate based on user touches (e.g., a key displayed on the touch screen).

Figure 9:
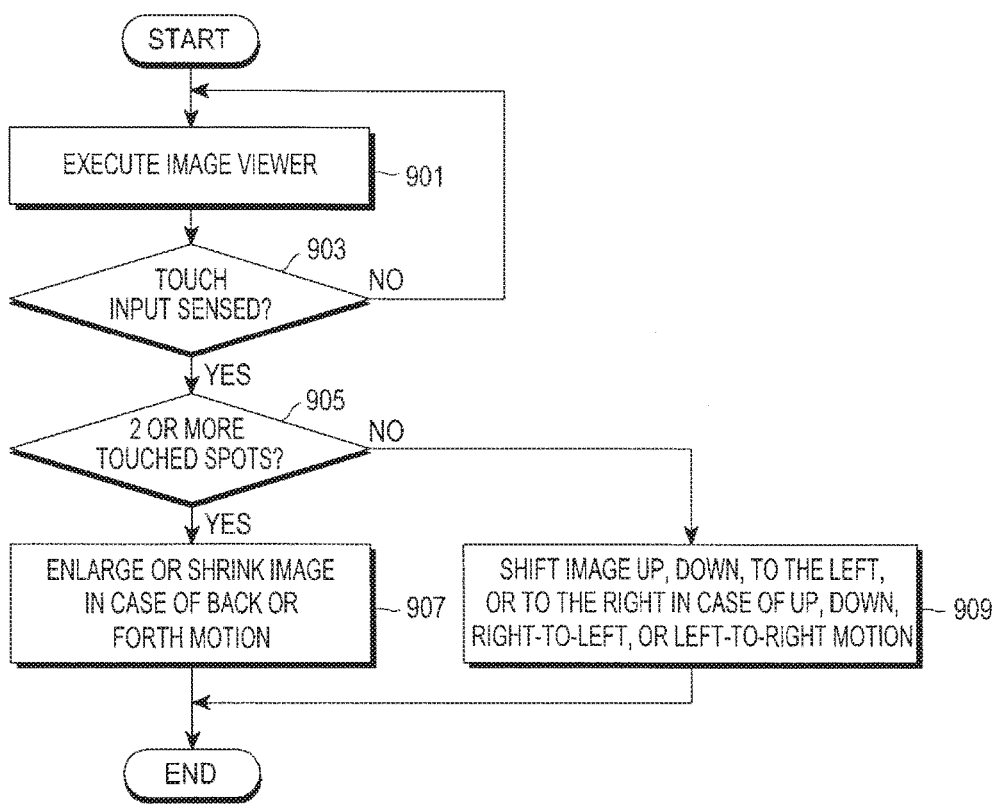
FIG. 9 is a flowchart illustrating an operation for controlling a motion-based user interface according to an exemplary embodiment of the present invention.

FIG. 9 is a flowchart illustrating an operation for controlling a motion-based user interface according to an exemplary embodiment of the present invention.

Referring to FIG. 9, upon receipt of a user input, the mobile terminal executes an image viewer to display an image such as a photo or Web page in step 901. The image is stored in the memory 305. If the mobile terminal is wireless Internet-enabled, the mobile terminal may display a Web page without executing the image viewer. In step 903, the mobile terminal determines whether a touch input has been sensed through the input unit 307. If a touch input has not been sensed, the mobile terminal continues executing the image viewer in step 901.

Upon sensing a touch input, the mobile terminal counts the number of spots touched on the touch screen and controls a displayed image in a different manner according to the number of touched spots in step 905. If two or more spots have been touched, the mobile terminal determines to enlarge or shrink the image and starts to sense a motion of the mobile terminal in step 907. In step 907, if the mobile terminal moves forward or backward or is inclined forward with respect to the user or reclined backward as illustrated in FIGS. 4A, 4B and 4C, the mobile terminal calculates a degree to which the mobile terminal moves up, down, to the left, to the right, back, or forth or a degree to which the apparatus is inclined forward, reclined backward, rotated to the left, or rotated to the right, using a gyroscope sensor included in the sensor unit and enlarges or shrinks the image in correspondence with the calculated degree. The motion of the mobile terminal is sensed by the gyroscope sensor of the sensor unit 311 and the distance for which the mobile terminal has moved or the degree to which the mobile terminal has been inclined is calculated by the motion calculator 309. In addition, two or more buttons may be assigned and pressed instead of two spots so as to enlarge or shrink the image.

If a single spot has been touched, the mobile terminal determines to shift the image in step 909 and starts to sense a motion of the mobile terminal. When the mobile terminal moves up, down, to the left, or to the right, or is inclined forward, reclined backward, rotated to the left, or rotated to the right as illustrated in FIGS. 5A, 5B and 5C, the moved distance or inclination or rotation degree of the mobile terminal is calculated and the image is shifted in a direction corresponding to the calculated degree. As described above, the motion of the mobile terminal is sensed by the gyroscope sensor of the sensor unit 311 and the distance for which the mobile terminal has moved or the degree to which the mobile terminal has been inclined is calculated by the motion calculator 309. In addition, a specific button may be assigned and pressed instead of one spot so as to shift the image.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An electronic device for displaying an image, comprising:
    a display configured to display a first image; and
    a processor configured to:
        while a number of touched spots on the display is a first value, detect a movement of the electronic device, wherein the movement of the electronic device is recognized as a command for moving the first image,
        determine a movement distance of the electronic device and a movement direction of the electronic device based on the detected movement of the electronic device,
        generate a second image by moving the first image based on the movement distance, in a direction opposite to the movement direction of the electronic device, and
        control the display to display the second image.

2. The electronic device of claim 1, further comprising:
    one or more sensors configured to generate one or more sensing values related to the movement of the electronic device,
    wherein the processor is further configured to determine the movement distance or the movement direction based on the one or more sensing values.

3. The electronic device of claim 1, wherein the processor is further configured to:
    if the electronic device moves from the left to the right, generate the second image by shifting the first image from the right to the left.

4. The electronic device of claim 1, wherein the processor is further configured to:
    if the electronic device moves from the right to the left, generate the second image by shifting the first image from the left to the right.

5. The electronic device of claim 1, wherein the processor is further configured to:
    if the electronic device moves up, generate the second image by shifting the first image down.

6. The electronic device of claim 1, wherein the processor is further configured to:
if the electronic device moves down, generate the second image by shifting the first image up.

7. The electronic device of claim 1, wherein the processor is further configured to:
if the electronic device moves from the left to the right, control the display to display the next image from among the plurality of images in the arrangement order of the plurality of images.

8. The electronic device of claim 1, wherein the processor is further configured to:
if the electronic device moves from the right to the left, control the display to display the previous image from among the plurality of images in the arrangement order of the plurality of images.

9. The electronic device of claim 1, wherein the processor is further configured to:
if the number of the touched spots on the display is a second value, determine the movement of the electronic device as a command for zooming-in or zooming-out the first image, and
zoom-in or zoom-out the first image based on the movement of the electronic device.

10. A method for displaying an image by an electronic device, comprising:
displaying a first image;
while a number of touched spots on a display of an electronic device is a first value, detecting a movement of the electronic device, wherein the movement of the electronic device is recognized as a command for moving the first image;
determining a movement distance of the electronic device and a movement direction of the electronic device based on the detected movement of the electronic device;
generating a second image by moving the first image based on the movement distance, in a direction opposite to the movement direction of the electronic device; and
displaying the second image.

11. The method of claim 10, further comprising:
generating one or more sensing values related to the movement of the electronic device; and
determining the movement distance or the movement direction based on the one or more sensing values.

12. The method of claim 10, wherein, if the electronic device moves from the left to the right, the second image is generated by shifting the first image from the right to the left.

13. The method of claim 10, wherein, if the electronic device moves from the right to the left, the second image is generated by shifting the first image from the left to the right.

14. The method of claim 10, wherein, if the electronic device moves up, the second image is generated by shifting the first image down.

15. The method of claim 10, wherein if the electronic device moves down, the second image is generated by shifting the first image up.

16. The method of claim 10, wherein, if the electronic device moves from the left to the right, the next image is displayed from among the plurality of images in the arrangement order of the plurality of images.

17. The method of claim 10, wherein, if the electronic device moves from the right to the left, the previous image is displayed from among the plurality of images in the arrangement order of the plurality of images.

18. The method of claim 10, further comprising:
if the number of the touched spots on the display is a second value, determining the movement of the electronic device as a command for zooming-in or zooming-out the image; and
zooming-in or zooming-out the first image based on the movement of the electronic device.

* * * * *